United States Patent
Latini et al.

(10) Patent No.: US 11,564,009 B2
(45) Date of Patent: Jan. 24, 2023

(54) SYSTEM AND METHOD FOR INTERACTIVE SET TOP BOX SETUP

(71) Applicant: Intraway R&D S.A., Montevideo (UY)

(72) Inventors: Patricio Latini, Buenos Aires (AR);
Sebastian Silva, Buenos Aires (AR);
Juan Sebastian F. Sicardi, Buenos Aires (BR)

(73) Assignee: Intraway R&D S.A., Montevideo (UY)

( * ) Notice: Subject to any disclaimer, the term of this patent is extended or adjusted under 35 U.S.C. 154(b) by 0 days.

(21) Appl. No.: 16/451,348

(22) Filed: Jun. 25, 2019

(65) Prior Publication Data

US 2019/0394524 A1 Dec. 26, 2019

Related U.S. Application Data

(60) Provisional application No. 62/689,274, filed on Jun. 25, 2018.

(51) Int. Cl.
| | | |
|---|---|---|
| *H04N 21/443* | (2011.01) | |
| *H04N 21/4788* | (2011.01) | |
| *H04N 21/45* | (2011.01) | |
| *H04N 21/422* | (2011.01) | |

(52) U.S. Cl.
CPC ..... *H04N 21/443* (2013.01); *H04N 21/42204* (2013.01); *H04N 21/4516* (2013.01); *H04N 21/4788* (2013.01)

(58) Field of Classification Search
CPC ........... H04N 21/443; H04N 21/42204; H04N 21/4516; H04N 21/4788
USPC ....................................................... 725/139
See application file for complete search history.

(56) References Cited

U.S. PATENT DOCUMENTS

| | | | | |
|---|---|---|---|---|
| 9,198,024 | B1 * | 11/2015 | Khalid | H04W 4/80 |
| 9,736,541 | B1 * | 8/2017 | Nijim | H04N 21/8146 |
| 2005/0028206 | A1 * | 2/2005 | Cameron | H04N 21/6405 725/46 |
| 2008/0166105 | A1 * | 7/2008 | Vanderhoff | H04N 21/4227 386/291 |
| 2009/0064251 | A1 * | 3/2009 | Savoor | H04L 43/50 725/139 |
| 2013/0183934 | A1 * | 7/2013 | Roemer | G06Q 30/06 455/411 |
| 2015/0079982 | A1 * | 3/2015 | Wu | H04W 4/50 455/435.1 |

(Continued)

OTHER PUBLICATIONS

Next Generation Telecommunnicaitons, Network, Services, and MANAGEMENT_IEEE_2010; (pp. 28, 41, 148 ) (Year: 2010).*

*Primary Examiner* — Nathan J Flynn
*Assistant Examiner* — Caroline Somera
(74) *Attorney, Agent, or Firm* — Peter A. Nieves; Nieves IP Law Group, LLC

(57) ABSTRACT

A system and method provide for installation and setup of a set-top box (STB) in a Digital TV network includes a mobile device running a mobile application, an operator application, and a display configured to display video from the STB. A status of the STB is determined and encoded into an optically scannable graphic displayed by the display. The optically scannable graphic is scanned with an optical device in communication with the mobile device and the status of the STB is decoded. The status of the STB is transmitted to the operator application compared with an acceptance criteria.

9 Claims, 7 Drawing Sheets

(56) References Cited

U.S. PATENT DOCUMENTS

| | | | |
|---|---|---|---|
| 2015/0256824 A1* | 9/2015 | Ramachandran | H04N 21/4126 725/131 |
| 2016/0036944 A1* | 2/2016 | Kitchen | H04L 67/12 709/203 |
| 2016/0171434 A1* | 6/2016 | Ladden | G06Q 10/083 705/332 |
| 2016/0366476 A1* | 12/2016 | Friel | H04N 17/00 |
| 2017/0127154 A1* | 5/2017 | Thattamangalam Narayanan | H04N 21/21805 |
| 2017/0188114 A1* | 6/2017 | Bibayoff | H04N 21/6547 |
| 2017/0221072 A1* | 8/2017 | AthuluruTlrumala | G06F 3/0482 |
| 2017/0366806 A1* | 12/2017 | Schaefer | H04N 17/04 |
| 2018/0007587 A1* | 1/2018 | Feldman | H04W 36/18 |
| 2018/0254799 A1* | 9/2018 | Latini | G01R 29/0878 |
| 2019/0166392 A1* | 5/2019 | Eyer | H04N 21/835 |
| 2019/0251759 A1* | 8/2019 | Lora | G06Q 50/30 |

\* cited by examiner

SYSTEM AND METHOD FOR INTERACTIVE SET TOP BOX SETUP

CROSS-REFERENCE TO RELATED APPLICATIONS

This application claims the benefit of U.S. Provisional Patent Application Ser. No. 62/689,274, filed Jun. 25, 2018, entitled "System and method for interactive Set-top Box set up," which is incorporated by reference herein in its entirety.

FIELD OF THE INVENTION

The present invention relates to telecommunications and more particularly, is related to installation and setup of a set-top box and digital television (TV) subscription.

BACKGROUND OF THE INVENTION

Digital television (DTV) refers to the transmission of television signals, including the sound channel, using digital encoding, in contrast to the earlier analog television technology, in which the video and audio are carried by analog signals. DTV is an innovative advance that represents the first significant evolution in television technology since color television in the 1950s. Digital TV transmits in an image format called high definition television (HDTV), with greater resolution than analog TV, in a widescreen aspect ratio similar to recent movies in contrast to the narrower screen of analog TV.

Digital TV delivers a signal via terrestrial transmitters ("signal sources") using an antenna, digital cable or digital satellites. DTV viewers typically include paying customers ("subscribers") for a provider ("TV operator"). The digital TV signal is broadcast, meaning that the same signal is transmitted unidirectionally to all the subscribers from the TV operator. A receiver ("set-top box" (STB)), is loaned, leased, or sold to the subscriber.

The STB is connected to a TV or a digital video recorder and an external signal source. The STB allows the subscriber to select a channel to view and plays the channel on the TV. When a new subscriber hires the service, or when a subscriber moves to a new home, the TV operator connects the STB to the DTV network so the STB can start receiving the DTV signal and (the TV operator) makes an assessment as part of a setup and activation assessment procedure. The TV operator decides whether to activate the service for this subscriber or not depending on this assessment. In particular, after the service is activated, the STB receives cryptographic credentials via a central authentication system (CAS) that allow the STB to decrypt the (encrypted) content it receives, including, but not limited to all the channels the subscriber has subscribed to with his subscription.

Typical STB installation and setup processes attempt to somehow report signal and/or performance quality metrics from the installation site to the TV operator by having a technician at the installation site with the STB call the TV operator, or a representative acting on behalf of the TV operator, or even a computer-guided interactive voice response (IVR) system, to rely information from the STB via the technician and so the technician may receive guidance to achieve pre-established quality standards.

A cable connects the STB to an external source of a signal, for example but not limited to an antenna, a satellite dish or a digital cable network. The cable connects the STB to the DTV network. The quality of the signal received by the STB may not initially be good. For example, when installing an antenna or satellite dish, the electronic equipment may be faulty and/or the antenna or satellite dish may be aimed in the wrong direction. In general, a technician acting on behalf of the TV operator sets up the external source of a signal and the STB, and makes an assessment before activation.

The TV operator designs a setup and activation process, including the assessment process, as a written (text) specification which details steps to be carried out by the technician and criteria for passing the assessment. The written specification may include, but is not limited to, the technician writing down the address where the STB is installed, using tools to measure the quality of the signal and ensuring that these values match the TV operator's standards (e.g., a parameter falls in a predefined interval), asking the subscriber to sign a consent form. Moreover, the written specification may instruct the technician to make adjustments (e.g., in the installation of the antenna or cable terminals) to pass the assessment.

After the STB and external source of a signal have been set up, the standard procedure is for the technician to communicate over the telephone with another TV-operator representative (hereafter representative), this representative being online with the TV-operator's infrastructure.

Optionally, technician and representative may go over a validation procedure, if the TV operator has defined this, to make sure some conditions are met before activating the subscription. These conditions may be analogous to those defined in the above written description. The technician shares information with the representative, including, for example, subscriber ID, address, details of the setup, and also quality metrics which may include signal level and signal quality parameters (e.g., the quality of the picture and sound received). The representative may then use software or guidelines to decide if validation is passed.

If the validation is not passed, the technician interacts with the representative to diagnose the problem. If the representative is not able to guide the technician into solving the problem, the technician may escalate the problem to a supervisor. The technician and supervisor may then repeat the process of information sharing, making adjustments and measurements, and passing the answers over the phone.

Sometimes the TV setup and activation procedure, which includes the assessment (sub)-process, involves verbal confirmation (consent) from the subscriber via telephone. This makes the setup and activation process long, and involves the technician, representative and subscriber coordinating over the phone. This procedure involves a sizeable amount of time and carries likewise sizeable costs for the TV operator. Even when the representative is replaced by an interactive voice response (IVR) system, the process remains expensive and time consuming. Further, in both cases the verbal communication of parameters is prone to error, which in turn, may lead the representative to draw false conclusions, retard the installation, or make the installation go wrong. Moreover, there may be problems associated with additional billing as explained herein.

Finally, the TV operator activates the subscription at his infrastructure, at which point, the STB receives cryptographic credentials and can access the content associated to the subscription. Also, at this point, the operator may start billing for the subscription. However, in this setting, the TV operator cannot confirm that the subscriber can view any TV channel after the subscription has been activated. Even verbal confirmation from the subscriber could not be trustworthy, for example, because the subscriber did not cheek one or more problematic TV channels. Such undetected problems may prompt additional complaints from the subscriber due to incorrect billing and hence additional costs for the TV operator. Therefore, there is a need for an STB installation and setup process that provides an increased effectivity without the shortcomings of the known processes.

SUMMARY OF THE INVENTION

Embodiments of the present invention provide a system and method for interactive set-top box setup. Briefly described, the present invention is directed to a system and method for installation and setup of a set-top box (STB) in a Digital TV network that includes a mobile device running a mobile application, an operator application, and a display configured to display video from the STB. A status of the STB is determined and encoded into an optically scannable graphic displayed by the display. The optically scannable graphic is scanned with an optical device in communication with the mobile device and the status of the STB is decoded. The status of the STB is transmitted to the operator application compared with an acceptance criteria.

An object of this invention is to provide a system and method to improve the quality of information used for installation and setup of a digital TV subscription, and in particular, for managing the information used during the assessment process.

It is another object of this invention to guide a technician present during the setup and activation in a quick and cost-effective process.

These and other benefits can be provided by an embodiment of this invention which includes one or more of a TV, a set-top box (STB), an external source of a signal, a network, an infrastructure, a mobile application and an operator application. Alternative embodiments of this invention may not include one or more of these elements.

In a preferred embodiment, a user (e.g., a technician acting on the TV operator's behalf) uses the mobile application to takes pictures of QR codes displayed in the TV. The TV is connected to an STB which in turn is connected to the network, for example, through the external source of a signal such as a cable network. The mobile application connects to a TV operator application (service). The TV operator application receives data from the mobile application. This data may include but is not limited to quality metrics calculated by the STB, other data generated by the STB, data entered by the technician or another person, which may include text, photograph images, and a signature.

The TV operator application processes data relevant to the installation and returns messages to the mobile application. In a preferred embodiment the messages include instructions for the technician, or they may include questions to be answered.

An exemplary embodiment of a method of STB installation and setup, in accordance with another embodiment involves:
a. Executing the "STB custom application" in the STB,
b. Taking one or more pictures of QR codes displayed in the TV with the mobile application camera, the mobile application converting the pictures of QR codes to data, connecting to the TV operator application service and sending this data;
c. Receiving a confirmation by the technician through the mobile application The embodiment provides an improved STB installation and setup process that decreases costs and the time of setup without the shortcomings of known processes.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1:
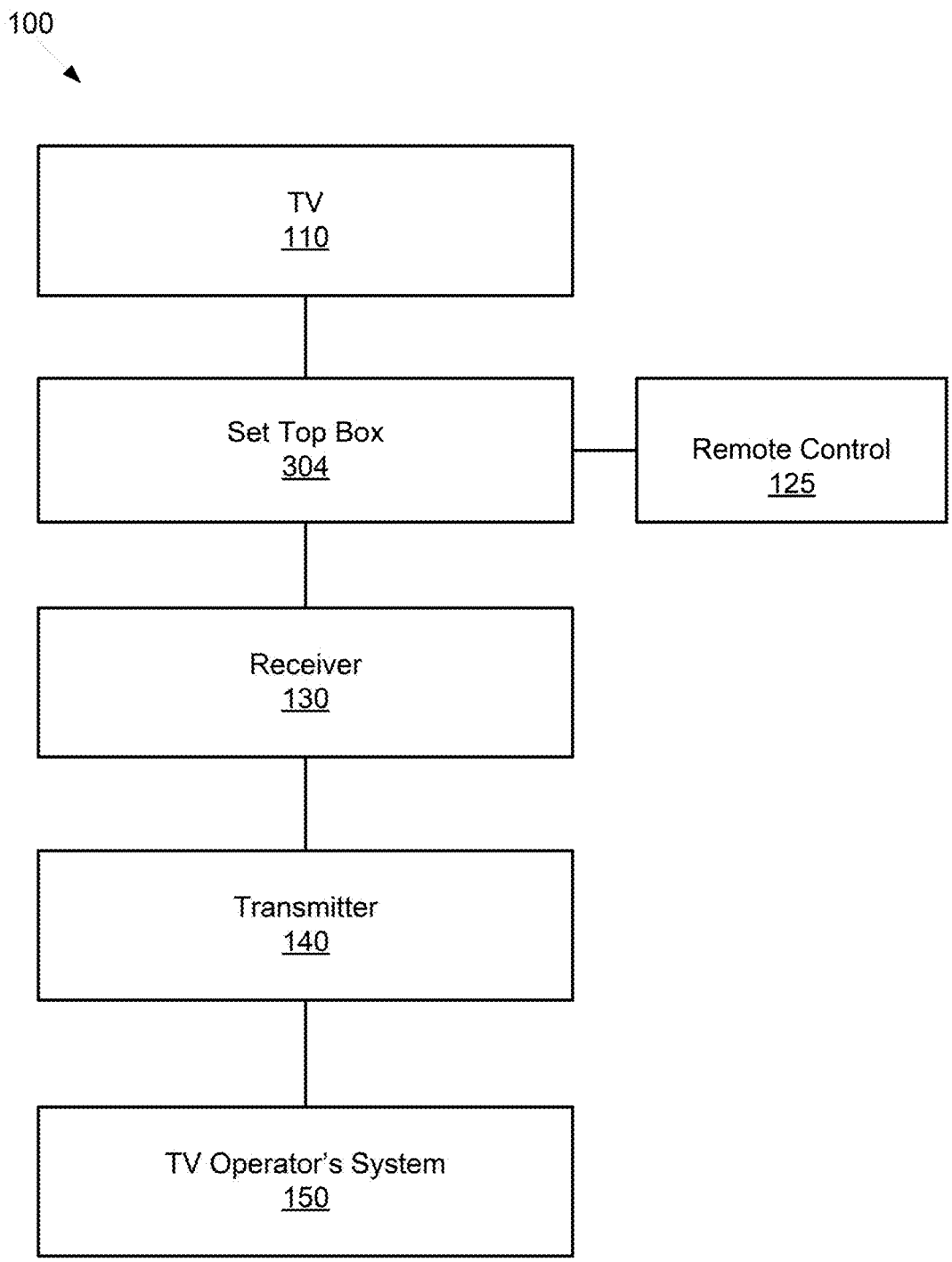
FIG. 1 is a schematic diagram of a prior art home installation.

The following definitions are useful for interpreting terms applied to features of the embodiments disclosed herein, and are meant only to define elements within the disclosure.

As used within this disclosure, an "optically scannable graphic" refers to a machine-readable representation of data, for example, a QR code, a bar code, or printed characters such as alphanumeric characters. The graphic is generally scanned using an optical device such as a camera or a laser scanner configured to recover data from the optically scannable graphic.

As used within this disclosure, a "status" of the set-top box refers to the value of one or more detected and/or derived parameters pertaining to operability of the set-top box. The status is generally indicative of a state of the set-top box at a given moment in time, and status may be refreshed (re-tested) after one or more operating parameters or inputs to the set-top box are changed/manipulated.

As used herein, an "installation instruction" refers to one or more steps of an STB installation process, also referred to as STB setup and activation process, conveyed to an (installation) technician via a mobile application.

As used herein, an "acceptance criterion" is used for comparison against a detected/derived parameter of the STB to determine whether the STB is operating according to a pre-determined set of acceptance criteria. For example, acceptance criteria for a noise level may include a threshold defining an upper boundary for acceptable noise, while signal strength level acceptance criteria may include a range of values, for example between a lower threshold (where the signal is too weak to be fully detected by a receiver circuit of the STB) and an upper threshold (where the signal is to strong and may overload the receiver). Other acceptance criteria are also possible, for example, Boolean criteria and conditional criteria (where an acceptable range/value of a first parameter depends upon the range/value of a second parameter), among others.

As used herein, "provisioned" refers to a STB that has been set up and activated, so that it is associated with a subscriber (for example, via a subscriber ID), while an "unprovisioned" STB is an STB that has not yet undergone setup and activation, and is therefore not yet associated with a subscriber.

Reference will now be made in detail to embodiments of the present invention, examples of which are illustrated in the accompanying drawings. Wherever possible, the same reference numbers are used in the drawings and the description to refer to the same or like parts.

Set-top box (STB) setup and activation involves providing an external signal source to the STB, carrying out an assessment process, managing administrative information, and activating a subscription. The assessment may include a validation of signal quality standards. The information management, on the other hand, may include associating the STB with a subscription, for example, using an associated subscription ID. Not all these steps are necessary in all scenarios and the steps may be executed in a different order than described herein.

Embodiments of the present application include an (TV) operator application that runs within the TV operator's infrastructure, for example as a web application run in a web server. The operator application accepts connections with and can connect to different instances of a mobile application (described below) and also connects and sends commands to the TV operator's infrastructure, which includes one or more central authentication systems (CAS); commands may include but not limited to activating a subscription with a given subscriber ID, giving this subscription access to a given set of channels. For example, in order to have the connections to and from the mobile applications the web server can have a connection to the interne, same as the mobile devices running the mobile application, and they can connect through the standard HTTP or HTTPS protocols. The operator application users are the technicians and managers who work under the operator. The operator application can access the subscribers table that associates subscribers with subscription IDs, STB ISDs. The operator application includes logic that can guide a technician through an installation (by this logic, we mean the different steps that the technician must follow to ensure the STB is receiving the signal correctly. This logic is added by the operator into the operator application. For example, if the STB reports that the signal includes interference, then this logic may ask the technician to ensure that cables are properly connected, and if the signal strength is low, then this logic may ask the technician to ensure that the satellite antenna is pointed in the correct direction by running a specific Antenna Direction function in the mobile application, a notch at a given frequency band may imply a problem with a connector, and a notch in another frequency may imply a faulty low-nose block downconverter etc.). The operator application can connect to and receive connections from mobile applications implementing cryptographically secure channels, and the operator application collects data sent from mobile applications (see below) through these connections. Examples of such data include, but is not limited to, data received through the mobile device camera including, but not limited to, QR codes and photographs that the technician is asked to take, text typed by the technician or subscriber, a quiz filled in by either, a signature drawn over the mobile device's surface, or even the sound of a conversation between technician and supervisor.

A mobile application that runs in mobile devices, used by technicians in charge of installing antennas and set-top boxes, which includes, for example, a GPS sensor, a camera, and a connection to the Internet (for example, mobile phone, or tablet): The mobile application can connect, over the internet, with the TV operator application using a cryptographically secure channel, or other category of secure or unsecure channel. The mobile application can decode QR codes and take photographs. The mobile application contains logic to guide a technician through installation, or in any case, may send information and receive guidance from the operator application.

Figure 3:
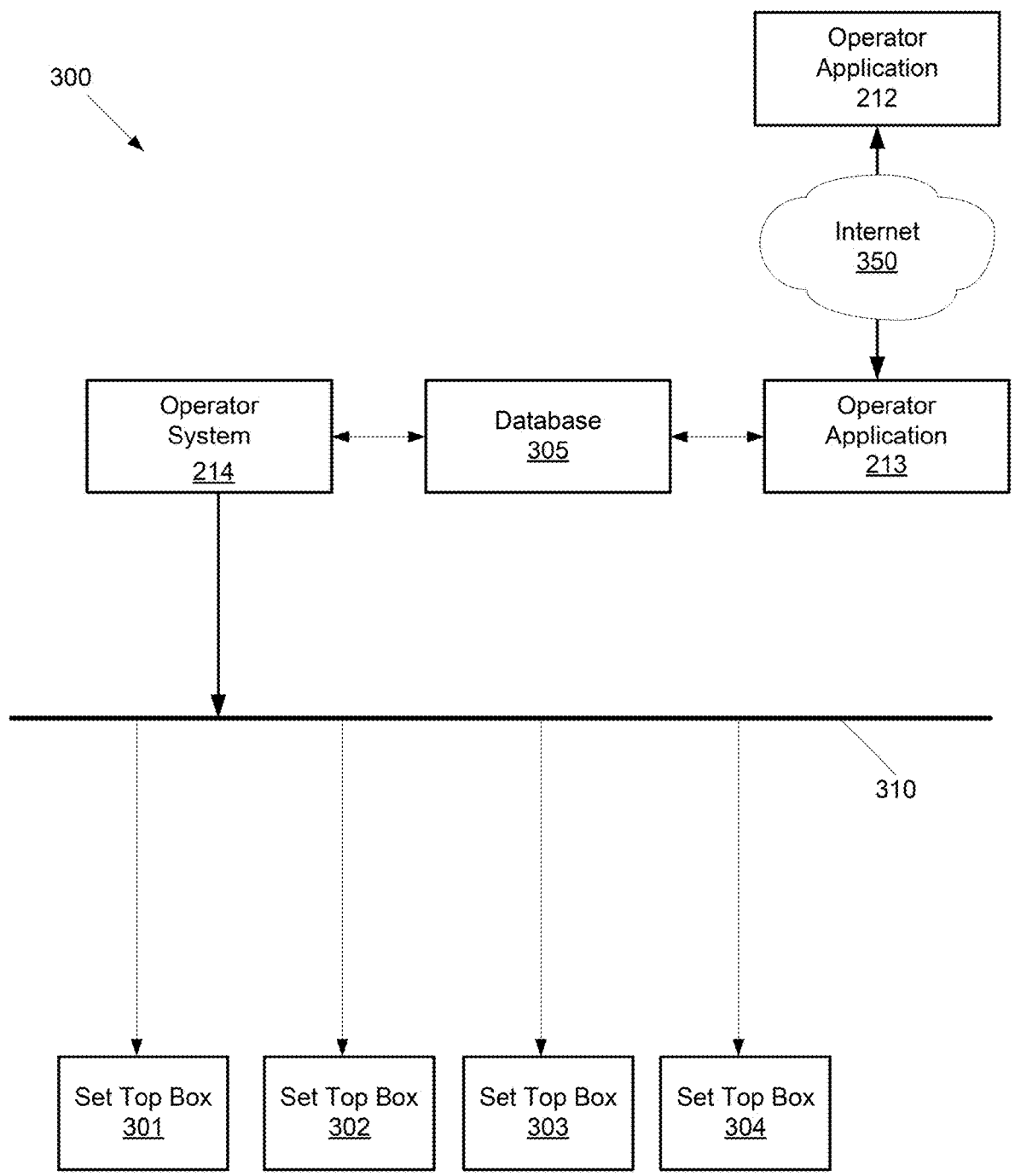
FIG. 3 is a schematic diagram of a first exemplary embodiment of a network of a TV operator.

FIG. 3 is a schematic diagram of a first exemplary embodiment of a network 300 of a TV operator, where a central system 214 transmits a broadcast signal through a DTV network 310 and one or more provisioned set-top boxes 301, 302, 303 receive this broadcast signal. An unprovisioned STB 304 that has not been associated with a subscription or activated to display TV provider content is to be joined to the DTV network 310. It should be noted that in general the STB 304 is referred to the STB being set up and activated.

The TV operator central system 214 includes a subsystem which holds information for its subscribers, including but not limited to, a subscribers table with STB IDs, subscriber names, physical addresses, and other information underlying the business of the TV operator. This subsystem may be a database 305, but can alternatively be any other data storage subsystem.

FIG. 1 is a schematic diagram of the network topology 100 in an STB setup and activation procedure. In the embodiment of FIG. 1 a TV 110 is connected to a STB 304, for example with a coaxial cable or an HDMI cable. The STB 304 is connected to an external source of a signal 130, for example, a receiver, an antenna, a satellite dish or a cable incoming from a CMTS. The external signal source 130 receives a signal from the TV operator network central system 140, which in turn, is generated by the TV operator's system 150, which for example may include a CAS and other subsystems. While this description refers to several STBs, it is to be understood that the STB being installed is STB 304.

Figure 2A:
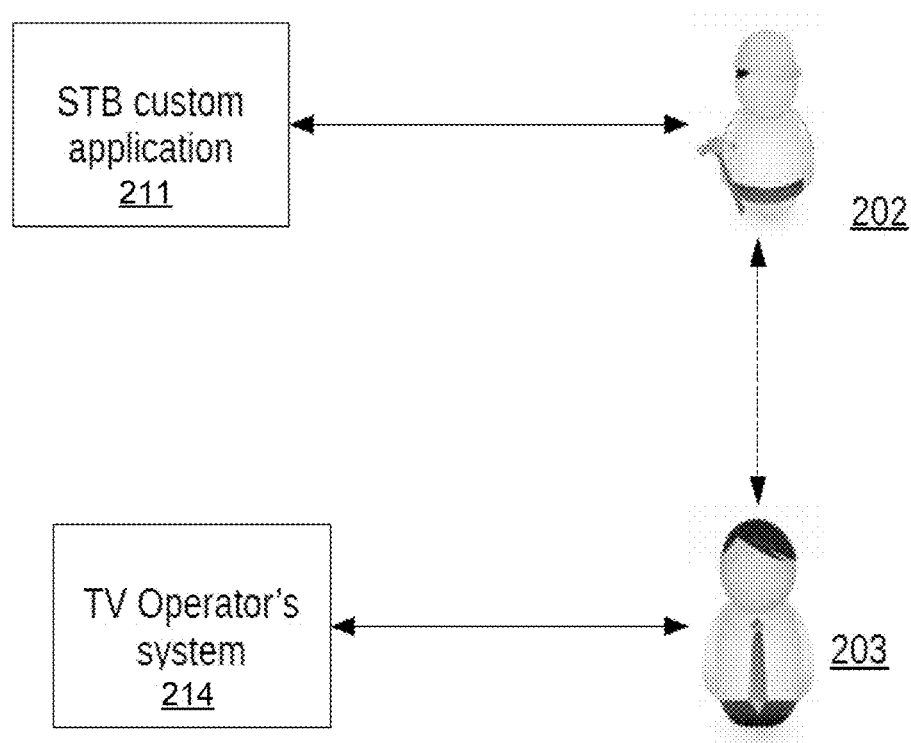
FIG. 2A is a schematic diagram indicating human interaction with a home installation.
Figure 2B:
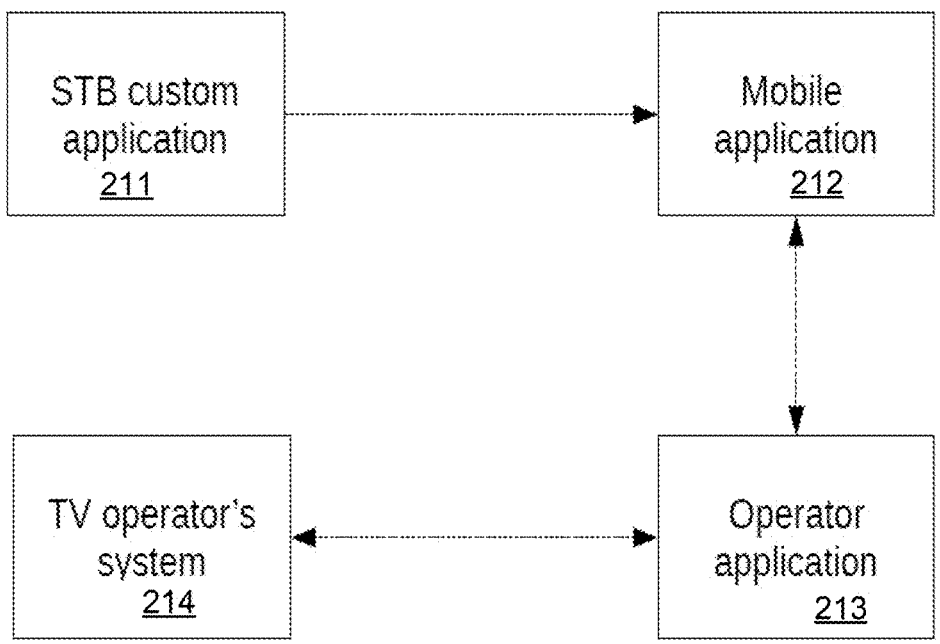
FIG. 2B is a schematic diagram of a first exemplary embodiment of a system for the home installation of FIG. 2A.

FIG. 2A-2B show the relationship between the personnel and the applications they are using during an installation. A technician 202 uses a mobile application 212, for example, hosted on a mobile device, to communicate with an operator application 213. The mobile application 212 and the operator application establish a bi-directional communication channel via the internet 350 (FIG. 3), for example, via a cell phone network of the mobile device hosting the mobile application 213. The technician 202 uses an STB remote control 125 (FIG. 1) to interact with the STB custom application 211 via an STB custom application menu displayed on the TV display 110. The operator application 213 is hosted by the TV operator's system 214, for example a server for the TV operator. A TV operator employee 203 operates the operator application 213. The operator application 213 may be hosted by a computer communicating in a network 300 of the TV operator (FIG. 3). In general, the technician 202 is considered to operate the mobile application 212 and/or the STB custom application 211 in proximity of the STB 304 being installed ("local to the STB"), so the technician may operate, configure, and directly manipulate the STB 304, while the TV operator 203, user of the operator application 213, is generally not in proximity of the STB 304, and may be referred to as being remote to the STB 304.

FIG. 2B indicates an exemplary TV operator architecture. FIG. 1 depicts the interaction of the specific components for this system and method. A user, for example, a technician acting on behalf or in coordination with the TV operator is at an installation site where the TV and STB are located. In this example shown in FIG. 1, the STB 304 is connected to an external source of a signal 130 and a TV 110.

According to embodiments of the present system and method, the mobile application 212 running on a mobile device and is in communication with the operator application 213, for example, via the internet 350 (FIG. 3). When the mobile application 212 is started, the mobile application 212 starts a new session with the TV operator application 213, and a "new setup and activation" option may be selected.

In the session established between the mobile application 212 and the operator application 213, the mobile application 212 may display a message asking the user (technician 202) to follow an administrative task. These administrative tasks may include:

entering information, including but not limited to, a subscriber ID, a subscriber name, a subscriber home (site) address, a Media Access Control (MAC) address or other information identifying the STB 304, a subscription ID and a work or service order ID.

taking pictures (photographs) of the objects in the installation, such as the installed satellite dish or antenna, the STB connection to the TV, the STB connection to external source of a signal, or other items. (The pictures can help the TV operator record several details: whether cables were properly connected to the components, if a socket that connects to the STB 304 was damaged, if an antenna was properly secured, for example, to building or if the antenna was loose, the length of cables used, etc.) The mobile application 212 may run quality checks on the pictures, or forward the pictures to the operator application 213 to run the quality checks on the pictures, and query the technician to re-take one or more pictures if not acceptable.

The mobile application 212 may further be used to automatically and/or manual provide information to the operator application 213 including the geolocation (as captured by a hosting device of the mobile application, for example a tablet computer or smart phone) and climate conditions associated to this geolocation (e.g., these can be available through the standard climate services, such as Weather channel, for the present geolocation, or the mobile application 212 may ask the technician to fill in the information manually).

The mobile application 212 sends information regarding the installation to the TV operator application 213, for example, via the internet 350 (FIG. 3), for example, over a mobile telephone network. Each piece of data (e.g., an address, a quality report, or a picture) may be encoded and transmitted as it is recorded in the mobile application 212 by the technician 202, or the mobile application may piece together two or more pieces (segments), encode a log, and then transmit the segments to the operator application 213. Alternatively, all or parts of this information may have been partially entered by the TV operator 203 via the TV operator application 213. For example, the TV operator application 213 may store an installation schedule in the database 305 (FIG. 3) for all the technicians 202 and so the operator application 213 may associate the installed STB 304 with a subscriber based on the subscriber a technician 202 is scheduled to visit at the time the operator application 213 receives a notification from the mobile application 212 of the technician 202 that the mobile application 212 has started an installation session. Thereafter, the operator application 213 and/or the mobile application 212 may retrieve the information regarding a specific customer (associated with the STB 304) that was already entered in the database 305 (FIG. 3) corresponding to the customer scheduled for an installation at the time the mobile application 212 starts a session.

The mobile application 212 may query the technician 202 to run the STB custom application 211 in the STB 304. The STB custom application may run automatically when the STB 304 is turned on for the first time, or at any time by having the technician 202 select this option directly via an STB 304 interface, for example, via a remote control 125 (FIG. 1) fix the STB 304.

The STB 304 runs firmware developed by its manufacturer (the vendor) for the TV operator. According to the embodiments herein, the STB 304 provides at least one option, for example via an on-screen menu, which provides access to the STB custom application 211. These options are new to the present embodiments. The new logic, as defined by the TV operator 203, is added to the STB 304 via the STB custom application 211. Once started (turned on), the STB 304 may display via the TV 110 a main menu of the STB. This main menu includes standard functions, plus an option to select the STB custom application 211.

The STB custom application 211 receives input from the technician 202 via, an STB remote control 125 (FIG. 1) and from the STB 304 itself. The STB custom application 211 executes tasks including, but not limited to, running functions to estimate signal strength and signal quality status. The STB custom application 211 uses the results from the tasks to compute derived parameters, such as signal strength and quality parameters (through the STB 304), collects these direct and computed results as diagnostic data, and encodes diagnostic data, status, and other data such as information identifying the STB 304 as well as additional technical information, as optically scannable graphics, for example quick-response codes (QR codes), and displays the QR codes via a screen of the TV 110.

When the STB custom application 211 is run, the TV 110 displays information regarding status of the STB via an STB dashboard or control screen. The control screen may include diagnosis information, for example, because some startup tests and diagnostics are run as the STB 304 is turned on, the results of the startup tests and diagnostics may be stored for display via the control screen, and alternatively or in addition some tests may be run when the STB custom application 211 is run. The control screen on the TV 110 may display the information in both a human-readable encoding and a computer-readable encoding. In particular, the control screen displays the information using optically scannable graphics such as the computer-readable QR code.

The QR code may include the encoding of the STB ID number (for example, the STB ID number is encoded as an alphanumeric string using the QR encoding algorithm into a QR code), and other information, including, but not limited to: hardware version of the STB 304, software version (of the firmware), digital TV signal strength and quality metrics, name of the satellite to which the STB 304 connects to, a low-nose block downconverter (LNB) used for the installation, how many output jacks does the LNB have, the streams it receives (transponder frequencies) and if they are syntonized according to expectations (e.g., if the values are below a quality threshold of the acceptance criteria). The mobile application 212 may optionally query the technician 202 to enter data.

The STB custom application 211 applies a known QR encoding process to encode alphanumeric text to a QR code displayed on the TV 110, and to decode a scanned QR code to alphanumeric text. The STB custom application 211 first assembles information, for example, the metrics the STB custom application 211 received by calling some of the STB functions and then proceeds to encode the information into one or more QR codes, depending on the size of the information and other factors as explained below.

Once the encoding is done, the custom application 211 displays a QR code on the TV 110. The mobile application 212 queries technician 202 to aim the camera of the mobile device hosting the mobile application 212 at the QR code displayed on the TV, Preferably, the STB 304 first uses the QR code of the biggest QR code version (such as version 40 or a smaller version number fixed by the TV operator), which can encode more information than smaller version QR codes. The first QR code the mobile application 212 captures (scans) in a session is typically used for adjustment. The custom application 211 receives this image and attempts to process the picture of the QR code and decode it. If the decoding is not possible, for example, because the TV resolution is too low to display this code clearly or because of the camera quality, the STB can switch to a smaller-versioned QR code and wait for the mobile application to capture this.

For example, the custom application 211 can wait for the technician 202 to either acknowledge reception or downgrade to lower version. The technician 202 uses the STB remote control 125 (FIG. 1) to instruct the STB custom application 211 fall back to a lower QR code version if the mobile application 212 indicates one or more errors reading the scanned QR code. The STB custom application 211 typically starts with a QR code of a higher version, and decreases by one version number after each failed attempt, until the technician 202 either stops downgrading the QR code version or acknowledges that a QR code has been decoded. The successful (or most recent) QR code version number is recorded and used thereafter for the session.

The STB 304 can continue sequentially displaying QR codes (via the TV 110) until all the information has been encoded. The STB 304 will then display a message in the control screen to indicate to the technician 202 that all the information has been gathered. The mobile application 212 can process the QR codes, decode the STB ID and other information, and transmit this to the TV operator application 213. The TV operator application 213 can then verify if this STB ID has been assigned to a subscriber, and verify that the expected subscriber name and address are the same as those reported by the technician 202.

The operator application 213 further assesses the diagnostic data received from the mobile application 212 and diagnoses installation problems, for example, if the quality standards of the TV operator are not met, and generates an assessment, for example, by running an assessment module. This assessment is based on logic defined by the operator on the values provided by the mobile application. For example, the assessment may require that the quality parameters within the received diagnostic data fall between predefined values, or that a consent form has been signed.

The setup specification is incorporated into the operator application 213, and the operator application 213 compares the received diagnostic data with the setup specification. For each reported parameter, for example, a noise level or a signal strength level, the assessment compares the parameter to determine if the parameter meets an acceptance criteria according to the setup specification. For example, a detected or derived signal strength level is compared to a signal strength level threshold to determine if the signal strength level is high enough to be accepted. Similarly, a detected or derived noise level is compared to a noise level threshold to determine if the noise level is below the noise level threshold in order to be acceptable. For other parameters, the acceptance criteria may be met if the parameter is within an acceptable range of values.

If the acceptance criteria is not met, the operator application 213 may sequentially provide the mobile application 212 with suggestions from a predetermined list of actions for the technician to adjust the STB and/or connections and to retest. This may be repeated for two or more iterations. These tasks may be but are not limited to, changing the orientation of the satellite dish, verifying that the connections are properly done or replacing one of the components used for the connection (of the external source of signal).

If all of the predetermined actions have been exhausted, the operator application 213 may establish a communication channel with the mobile application 212, such as a voice or text channel, to provide for person-to-person interaction between the operator 203 and the technician 202 to debug the issue.

The assessment may further require the approbation of the operator 203. The operator 203, for example, may review the photographs to ensure that the operator's requirements are met, for example, the satellite dish has been photographed. The operator application 213 can either approve or disapprove the assessment based upon an installation and setup specification.

The tasks may be conveyed via messages may be either encoded as part of the setup and activation specification into the operator application (so that they are generated automatically from the information received, for example, via a script, such as a Business Process Model and Notation (BPMN)), or may be generated by a representative of the TV operator 203. The predefined list of tasks may be presented to the operator 203, for example in a pop-up menu on the operator application 213 so the operator 203 may select one or more presented tasks to be conveyed to the mobile application 212. For example, this operator 203 may be a trained technical individual who can interpret the information received and enforce the specification. To do this, the operator 203 may, for example, use an interactive chat (sub)-application that runs both in the mobile application 212 and operator application 213. The operator 203 then accesses the operator application 213, joins the session, and can view via a computer screen the information for this session and control the chat application, for example, receiving and sending text messages, pictures, etc.

Once the technician 202 is done with the tasks received through the mobile application 212, for example, tasks to fix a diagnosed problem, the technician 202 may be asked by the mobile application 212 to re-run diagnostics in the custom application 211 and capture the QR codes encoding the results. The mobile application 212 then decodes the information and sends it to the operator application 213. Then, the operator application 213 can re-assess the setup and activation, and respond with approval or disapproval.

This process of assessing, executing fixing tasks and re-assessing may be repeated until the installation is successful according to logic in the setup and activation specification. Optionally, after a fixed number of attempts have been made, or because of a condition that is explained by the information received by the operator application. 213, the operator application 213 may prompt for a supervisor. That is, the operator application 213 interrupts the communication between the operator 203 and the technician 202, and replaces the operator 203 by a supervisor (not shown). The supervisor is another human being, who works for the TV operator and has skills in installation, setup, activation, and problem resolution.

The supervisor connects to the TV operator application 213 as another user, e.g., from the TV operator's headquarters. The operator application 213 presents the supervisor with information such as the signal strength and quality values, the hardware version and software version for the STB 304, the LNB version and other information. The operator application 213 and mobile application 212 may open a communication between the technician 202 and supervisor, for example via chat or phone conversation.

At any time, the TV operator application 213 can act upon the information it has received during the session, interact with its provisioning infrastructure and activate the subscription in a manner which is known to those having ordinary skill in the art. The mobile application 212 (as per the operator application 213) can ask the technician 202 to have the "service order" signed by the subscriber in a paper receipt and take a photograph of this, or alternatively the subscriber may indicate approval in the mobile device of the technician 202, for example, if the mobile device has a tactile screen.

The mobile application 212 may also ask the technician 202 to conduct a survey or questionnaire with the subscriber or ask the technician 202 to hand over the mobile device so that the subscriber can fill the survey directly.

The TV operator application 213 includes logic to guide technicians 202 during STB installation, which may include, for example, setup, activation, verification, and fixing processes. This logic may follow a "setup activation and specification" that is defined by the TV operator. The TV operator application 213 communicates with any instances of the mobile application 212 running in the mobile device of each technician 202. Typically, the mobile application 212 identifies the technician 202 operating the mobile application 212, for example, after the technician 202 has logged into the mobile application with his username, so that the operator application 213 may access information regarding the technician 202, for example, in the database 305, that the operator application may use to assist in the installation, for example, the technician 202 has as schedule appointment at the time the mobile application 212 connects with the operator application 213.

Figure 6:
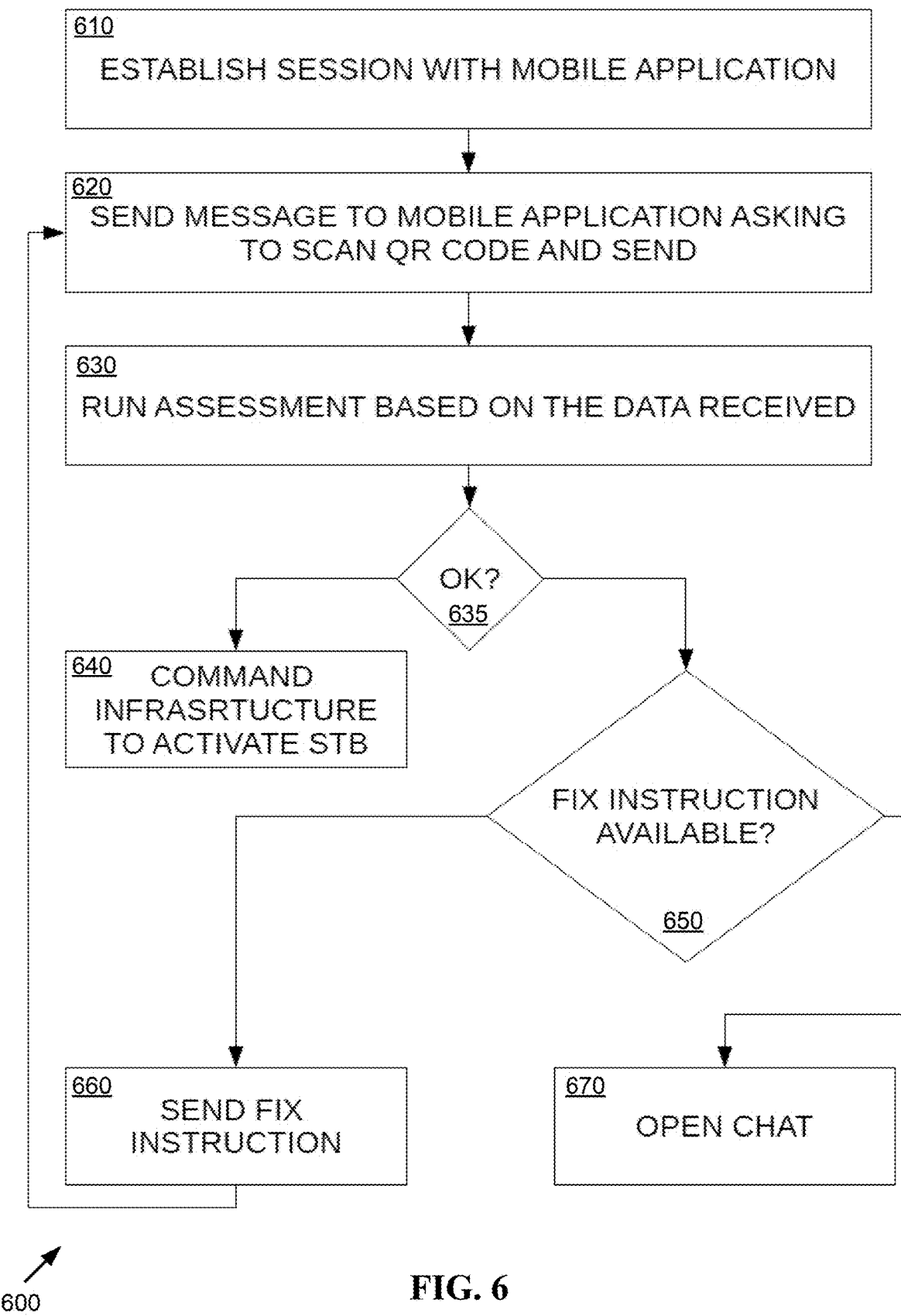
FIG. 6 is a flowchart of an exemplary embodiment of a method for an operator application.
Figure 7:
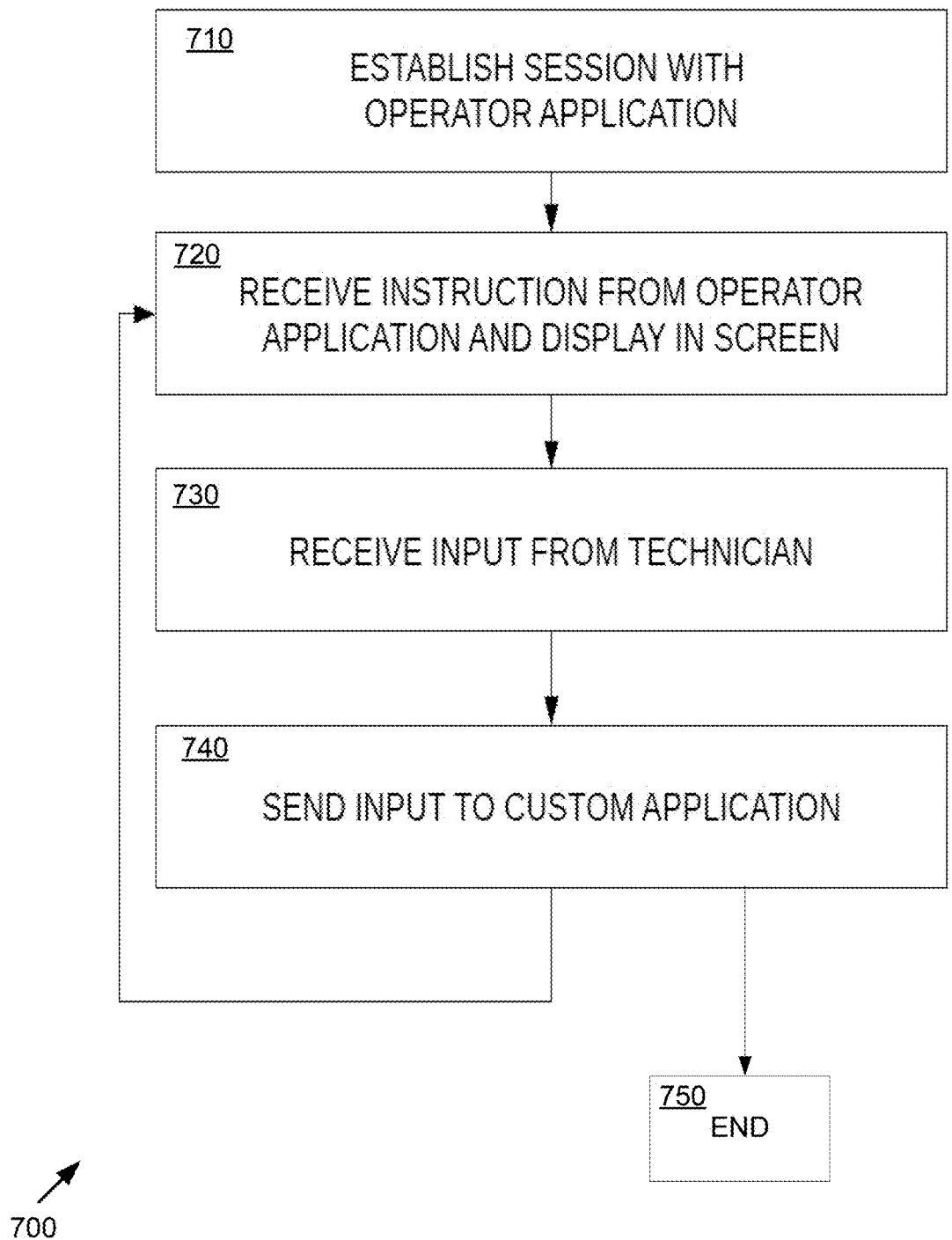
FIG. 7 is a flowchart of an exemplary embodiment of a method for a mobile application.

FIGS. 6 and 7 show flow charts 600, 700 of a typical interaction between a mobile application and the operator application. The mobile application connects to the operator application, e.g., by making an HTTP/HTTPS request and returning a response, as shown by blocks 610, 710. For example, the mobile application 212 acting as a client and the operator application 213 acting as a server start a session through a secure channel on the network 300 (FIG. 3), for example, via the internet 350. In particular, the operator application receives user credentials that identify the technician.

The operator application 213 may then exchange commands with the mobile application 212. For example, a command may include a "a new setup and activation" command or may be a command to re-start a session for an older setup and activation.

Upon receiving "a new setup and activation" command, the operator application 213 sends a request for information to mobile application 212, as shown by blocks 620, 720. The request for information may query the technician 202 for information as described above, for example by asking the technician to type information, take pictures, et cetera, which the technician 202 provides to the mobile application 212, as shown by block 730.

In accordance with the setup specification, upon the mobile application 212 sending information to the operator application 213, the operator application 213 may request more information, open a chat, or initiate another interaction with the mobile application 212. When a supervisor or representative is requested to participate in a chat, the TV operator 203 prompts one or more representatives or supervisors, for example, who are logged in and idle. (If there is no idle representative, available, the operator application 213 may submit an entry into a representative/supervisor queue for the next available representative or supervisor.

The (TV) operator application 213 uses information received from the mobile application 212 to either approve or disapprove the setup and activation, as per the TV operator setup and activation specification, for example by executing an assessment module, as described above and shown by block 630. If the setup and activation is approved as shown by block 640, the operator application 213 communicates with other components in the infrastructure to activate the subscription for the STB 304. On the other hand, if the setup and activation is disapproved, the operator application 213, through the mobile application 212, can display a solution as a series of steps for the technician to follow (called a "fix instruction"), as shown by blocks 650 and 660. The mobile application 212 receives these steps, as shown by block 730, and interacts with the custom application 211, as shown by block 740. If the operator application 213 does not have a fix instruction available, or has exhausted a list of predetermined fix instructions, the operator application 213 may open a communication channel with the mobile application 212, such as a text or voice chat, as shown by block 670. If no further instructions are forthcoming from the operator application, the mobile application 213 ends, as shown by block 750.

Alternatively, the operator application 213 may request a representative to follow a procedure, for example: a representative for the TV operator is logged into the operator application 213. The representative presented with a screen with the information received from the mobile application 212. The representative can make a decision based upon the information presented and the setup and activation specification. The representative can then select an option on the screen of the operator application 213 to approve or disapprove the setup and activation. The approval step is analogous to the operator-application mandated step described previously. In case of disapproval, the representative can open a chat with the technician 202 and interact in order to solve the problems that implied the disapproval, as discussed above. Next, the representative can ask the technician 202 to perform a new assessment. The operator application 213 then receives the results of the reassessment.

The mobile application 212 and the operator application 213 may be implemented using technology that is standard in application development. As an example, the mobile application 212 and the operator application 213 may be implemented as web-applications running in a web server and running along an SQL database management system. A database 305 in the database management system contains tables with subscriber information, equipment information, subscription plans, users and user roles. The web-application has an application-programming interface (API) that expects connections from the mobile applications, each of which holds a unique ID that identifies its user (one of the technicians 202). Each time there is a new STB installation, the mobile application 212 and TV operator application 213 start a session which follows a script, that may or may not include branches (if-then-else clauses). For example, the operator application 213 first expects to identify the subscriber and STB ID from the mobile application 212 and then expects to receive the information from the mobile application 212. From this information, the operator application 213 can look up the STB brand and model, retrieve the expected service levels and compare them with those received from the mobile application 212. If the service levels are within acceptable boundaries, then the operator application 213 asks the technician 202 via the mobile application 212 to fill in a questionnaire, or else to run a diagnosis procedure questionnaire scripts, diagnosis procedures, chat applications and other tools may be integrated into the operator application 213. Explicitly, the operator application 213 and mobile application 212 may include sub-applications including but not limited to a chat application or open a voice communication channel with a directory, so that technicians 202 can access supervisors and vice versa. Other applications may include a survey system that allows the operator to load questions and answer formats (e.g., multiple choice, text), and custom diagnostic functions that access functions provided by the STB 304.

The supervisor functionality, as discussed previously, is analogous to the representative functionality. The logic of the operator application 213 may include an option to call a supervisor when certain problems appear during installation, or upon request by the technician 202 or representative. When the operator application 213 and/or the mobile application 212 requests intervention from a supervisor, the request is placed in a supervisor-requested queue. One or more supervisors are continuously logged in during service hours, if one supervisor is available, the supervisor joins into the session and the supervisor request is removed from the supervisor requested queue.

Once the supervisor is added to the session, the operator application 213 shows the supervisor an installation dashboard summarizing installation information (e.g., related to the present installation) available in the operator application 213 so the supervisor can quickly diagnose the problem and propose a solution. The supervisor can then use a chat or voice to communicate the solution plan to the technician 202. The operator application 213 sets up the chat or call using the chat/call application and the information for technician 202 and supervisor.

All information relayed from one or more mobile applications 212 to the operator application 213 may be recorded and stored in the database 305. For each STB 304 installation, the operator application may record, among others, the following data:

Time elapsed from start of TV dish installation to plugging the STB 304, time elapsed to go through the STB custom application, et cetera.

The hardware used during the installation, e.g., satellite dish, cable, etc.

The problems encountered and the success rate of each solution

Elapsed time to implement each potential solution suggested by the application

Photographs of the installed TV dish, house door, STB location (e.g., living room, dormitory)

Signed service order where the subscriber acknowledges that the installation was successful Name and ID of the technician 202 in charge of the intervention.

Subscriber answers to the surveys.

Subscriber signature signaling approval.

The mobile application 212 may prompt the technician 202 to show a video or a text to the subscriber. Once done, the subscriber is asked to acknowledge viewing the content.

If the installation involved supervisor intervention, the operator application 213 records the name of the supervisor and the amount of time the supervisor spent assisting the technician 202.

This information can be aggregated and displayed in the installation dashboard within the operator application 213. Hence, a manager for all the technicians 202 can check the performance of each technician 202 (e.g., how many installations performed per day, how many requests for assistance, time efficiency performing specific tasks), etc.

A supervisor can use the operator application 213 to check metrics for the problems found, the solutions proposed by the system, and their success/failure rate. The supervisor can then decide whether the logic (in the specification) needs to be changed and replace one fix for another, or recommend the TV operator should stop using a particular firmware version, or recommend that the operator should decommission specific models/manufactures of STBs due to installation issues.

Once the operator application 213 approves an installation, the operator application 213 may interact with the infrastructure to activate the STB 304, for example, by commanding the GAS system to add the STB ID as valid. From this point on, the STB 304 receives the cryptographic keys that allow it to decrypt the TV signals and can decode TV for the subscriber.

In alternative embodiments the system and method may include guidelines so that each STB vendor may implement the STB custom application 211 which runs in the STB 304. So installation for each STB 304 implemented in accordance with the present system and method includes a version of the STB custom application. When the menu option is pressed, the vendor implemented custom application runs. Optionally, the custom application may run when the STB is turned on for the first time.

Upon starting, the STB custom application displays a menu to the user (e.g., the technician 202) offering different options such as displaying different quality parameters, and encoding their values as QR codes and displaying them to the TV 110. The quality parameters and other values are retrieved by the STB custom application 211 from the STB through an API (application-programing interface) that the STB standard firmware exposes.

As previously described, when the information is displayed in a QR code, the technician 202 preferably scans the QR code using the camera of mobile device running the mobile application 212. The mobile application 212 either acknowledges that the QR code was read properly or was not read properly. The STB custom application may concurrently ask the technician 202 to confirm if the QR code was read properly, and if the technician 202 answers no, then the STB custom application replaces this QR code with a sequence of one or more QR codes having a lower resolution.

When the technician 202 is done with using the STB custom application, the technician 202 can exit from the menu, and the STB menu may resume displaying its standard options.

It should be noted that, while the STB of the above embodiments with the STB custom application utilize QR codes for exemplary purposes, alternative embodiments may use any machine-readable representation of data in place of the QR codes.

Figure 4:
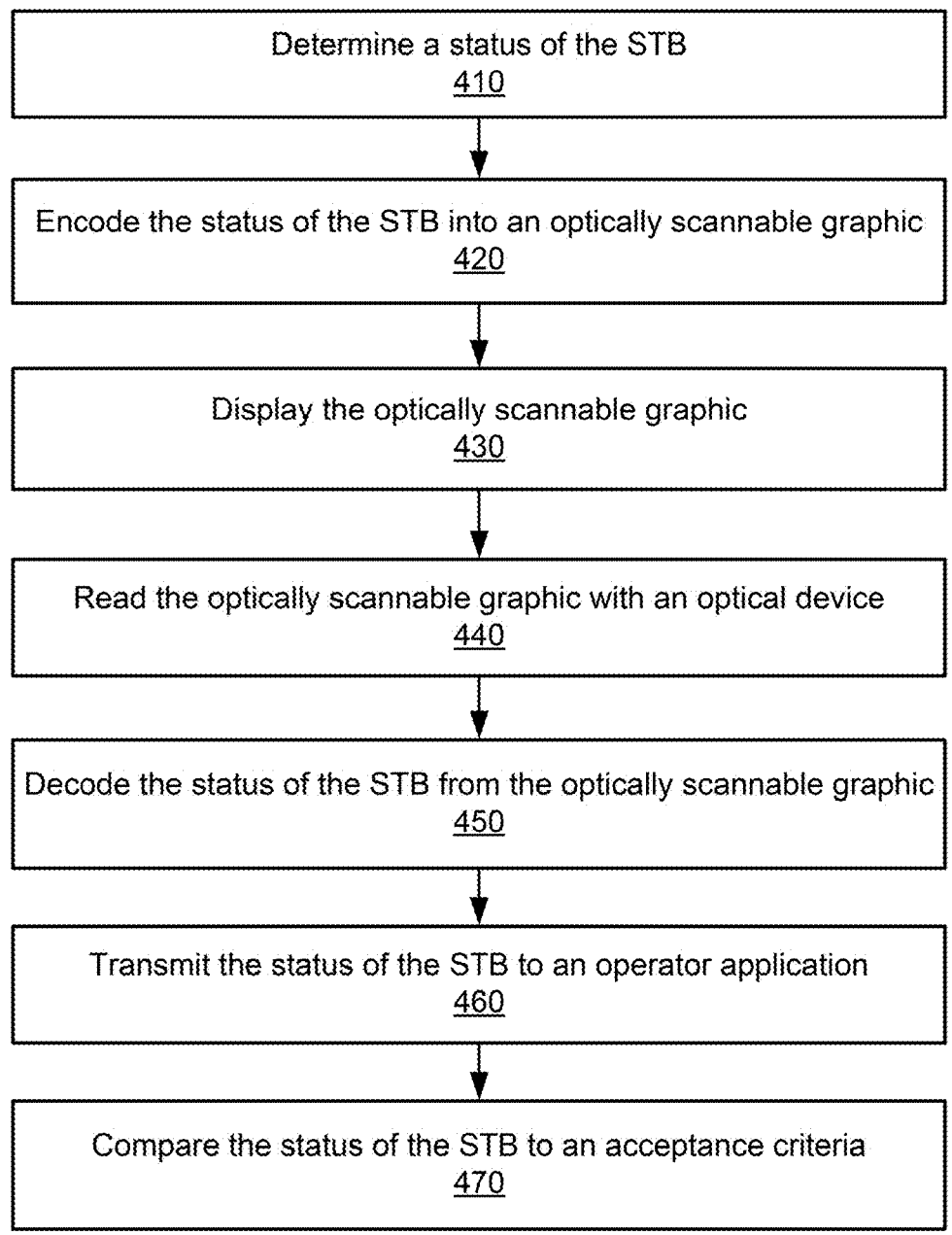
FIG. 4 is a flowchart of an exemplary first embodiment of a method for installing an STP.

FIG. 4 is a flowchart of an exemplary first embodiment of a method for installing a STP) in a Digital TV network having a mobile device running a mobile application, an operator application, and a display configured to display video from the STB. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A status of the STB 304 is determined, as shown by block 410, for example a measured signal quality parameter. The status of the STB 304 is encoded into an optically scannable graphic, as shown by block 420, for example, a QR code. The optically scannable graphic is displayed, for example by a display of a television 110 attached to the STB 304, as shown by block 430. The optically scannable graphic is read with an optical device in communication with the mobile device, as shown by block 440, for example, a smart phone hosting the mobile application 112 scanning the optically scannable graphic.

The status of the STB from the optically scannable graphic is decoded, for example, by the mobile application 112, as shown by block 450. The status of the STB is transmitted to the operator application 213, as shown by block 460. Alternatively, the mobile application may transmit a captured image of the optically scannable graphic to the operator application 213. Where the operator application 213 decodes the status of the STB. The operator application 213 compares the status of the STB to an acceptance criteria, as shown by block 470. The operator application 213 may then determine whether or not activate a service subscription for the STB 304. The service subscription for the STB 304 may be activated by the CAS system.

Figure 5:
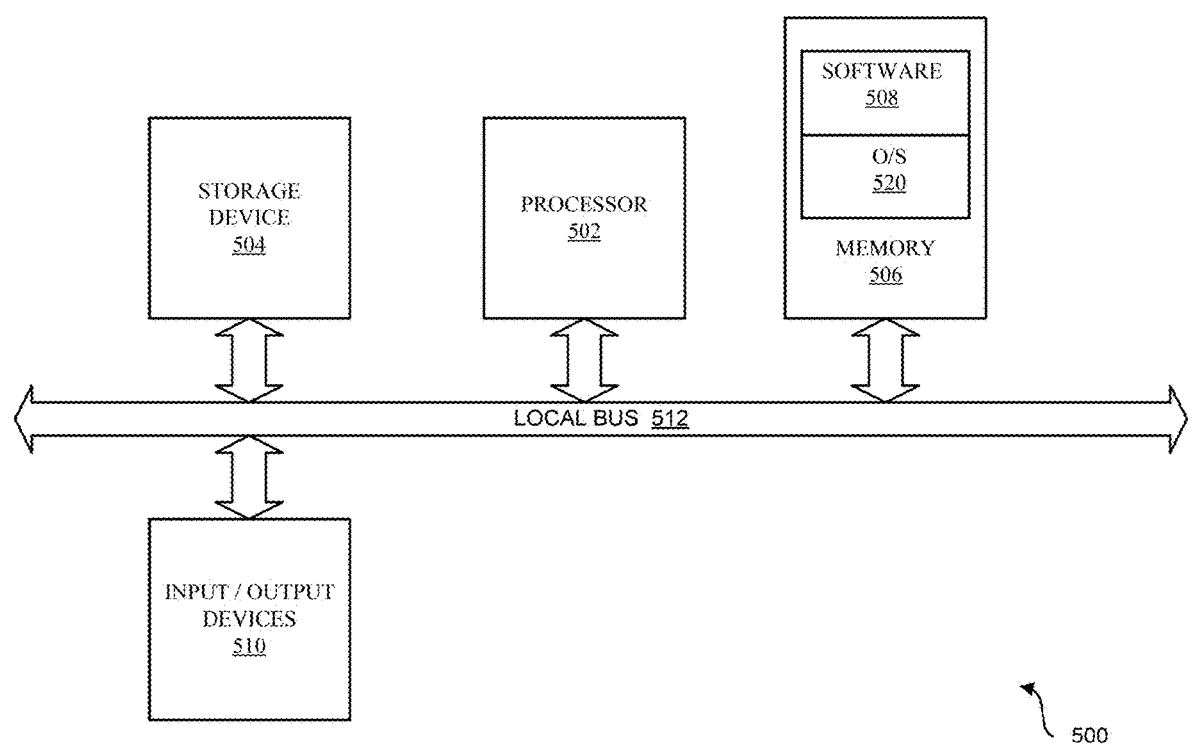
FIG. 5 is a schematic diagram illustrating an example of a system for executing functionality of the present invention.

The present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a rnacroprocessor, or generally any device for executing software instructions.

The memory 506 can include any one or combination of volatile memory elements (e.g., random access memory (RAM, such as DRAM, SRAM, SDRAM, etc)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, hut can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

While the above embodiments refer to the technician as the operator of the mobile application, in alternative embodiments the actions of the technician may be performed by the subscriber. For example, the subscriber may download the mobile application on his own device, such as a smart phone or a computer tablet, and interact with the STB and the operator application in the same manner as the technician as described above, for example, starting the STB custom application from the STB menu, and scanning the QR codes from the TV screen using the mobile application.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer based method for installation and setup of a set-to box (STB) in a Digital TV network comprising a mobile device running a mobile application, an operator application, and a display configured to display video from the STB, the method comprising the steps of:
   determining a status of the STB via a STB application;
   encoding the status of the STB into a first optically scannable graphic via the STB application;
   displaying the first optically scannable graphic on the display configured to display video from the STB;
   reading the first optically scannable graphic with an optical device in communication with the mobile device;
   decoding the status of the STB from the first optically scannable graphic via the mobile application;
   transmitting the status of the STB to the operator application via the mobile application; and
   comparing the status of the STB to an acceptance criteria;
   detecting an error in the scanned first optically scannable graphic; and
   displaying a second optically scannable graphic,
   wherein the second optically scannable graphic has a lower resolution than the first optically scannable graphic.

2. The method of claim 1, further comprising the step of activating a service subscription for the STB.

3. The method of claim 1, further comprising the steps of:
   providing an installation instruction to the mobile application; and
   displaying the installation instruction on the mobile application.

4. The method of claim 3, wherein the installation comprises:
   directing a user to run an antenna direction procedure in the mobile application; and
   directing the user to re-position the antenna.

5. The method of claim 1 wherein the status of the STB comprises subscriber information.

6. The method of claim 5, wherein the subscriber information comprises a subscriber ID and an STB ID.

7. The method of claim 1, wherein the status of the STB and the acceptance criteria comprises signal quality data.

8. The method of claim 1, comprising the step of providing a chat communication channel between the mobile application and operator application.

9. The method of claim 1, further comprising the steps of:
   receiving a signature from the subscriber by the mobile application;
   conveying the signature to the operator application; and
   storing the signature by the operator application.

* * * * *